Figure 1:
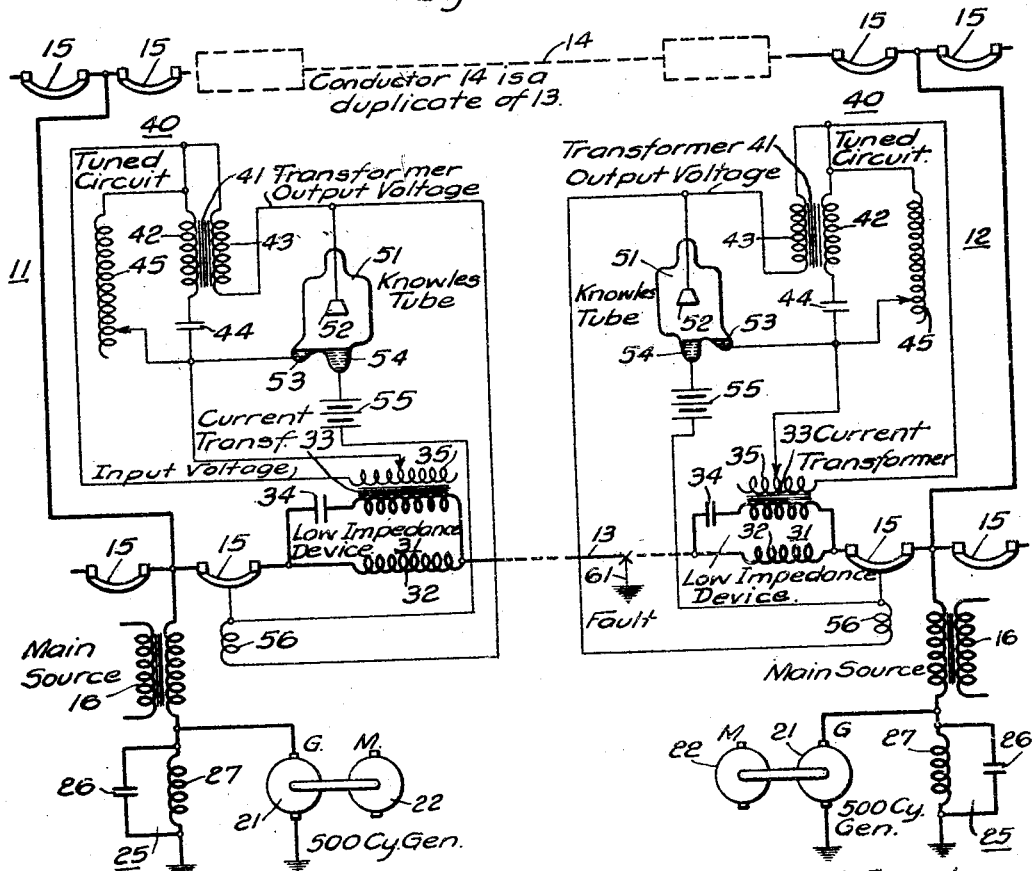

Nov. 10, 1931.  L. R. LUDWIG  1,831,019

TRANSIENT RELAY PRESETTING DEVICE

Filed May 3, 1928  2 Sheets-Sheet 1

INVENTOR

Leon R. Ludwig

BY

ATTORNEY

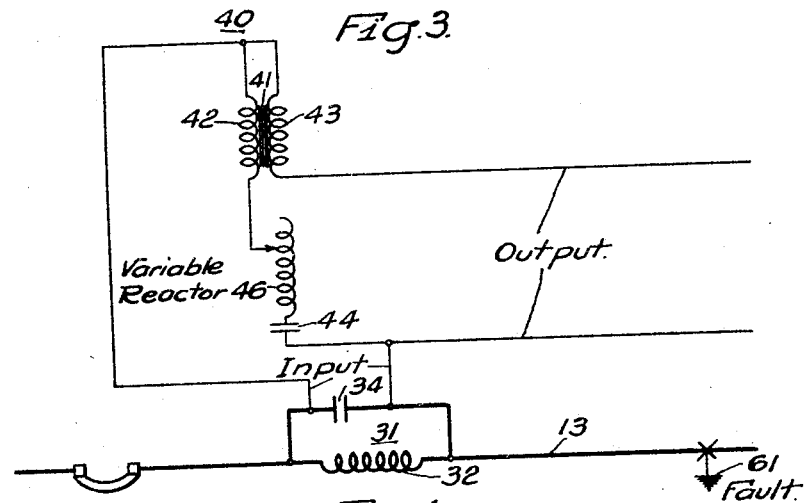
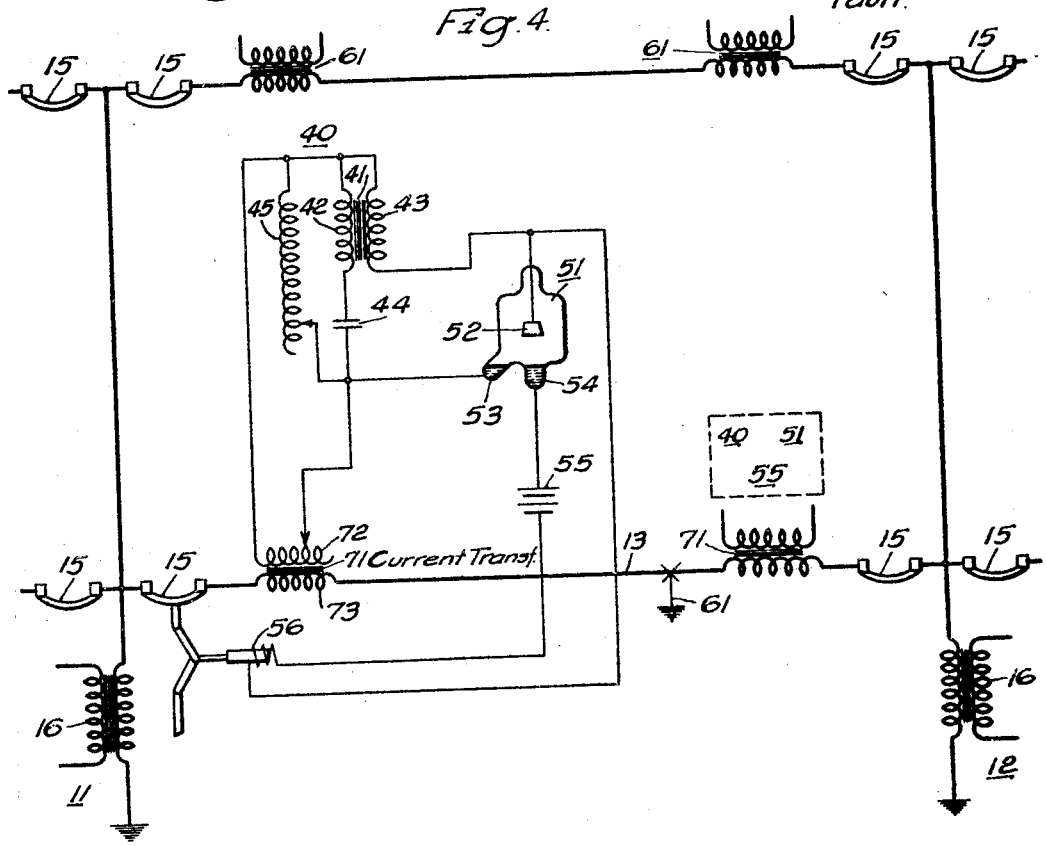

Patented Nov. 10, 1931

1,831,019

UNITED STATES PATENT OFFICE

LEON R. LUDWIG, OF WILKINSBURG, PENNSYLVANIA, ASSIGNOR TO WESTINGHOUSE ELECTRIC & MANUFACTURING COMPANY, A CORPORATION OF PENNSYLVANIA

TRANSIENT RELAY PRESETTING DEVICE

Application filed May 3, 1928. Serial No. 274,785.

This invention relates to protective systems and protective apparatus, and particularly to fault-discriminating and load pre-setting devices for such systems and apparatus.

The principal objects of this invention are as follows:

To provide means by which a circuit-breaker-operating relay may be rendered responsive only to transient conditions or special changes in voltage or current.

To provide means for pre-setting a relay to correspond to various load conditions in a power circuit to be protected.

To provide means which shall cause a relay to become effective when the voltage impressed upon it rises or changes rapidly but which shall not be effective when a relatively slow rise or change in voltage occurs.

To provide means responsive to electrical energy for pre-setting an electrical device.

To provide an automatic vacuum-tube-relay protective system for a power system or other electric system.

To provide a device for automatically pre-setting an electrical device.

To provide a pre-setting device which shall be mechanically static.

To provide a translating device responsive to an input voltage for delivering an output voltage and characterized by the fact that the output voltage is normally substantially a constant for varying values of slowly changing input voltage.

To provide a voltage-translating device having magnetically opposed windings, one of the windings being tuned to the applied voltage to provide time delay in magnetizing the device.

To provide an energy-translating device responsive to transient energy only for isolating a fault producing such transient energy.

To provide a voltage-translating device characterized by the fact that the output voltage remains substantially constant when increments of increasing input voltage are applied relatively slowly to the device.

To provide a voltage-translating device characterized by the fact that the output voltage returns to its initial value when changes in input voltage have become steady.

To provide a voltage-translating device which shall remain uniformly responsive and proportional to changes in power-line-load conditions, regardless of the previous load conditions therein.

In this invention, a device which may be called a voltage-translating device, is utilized to pre-set a circuit-breaker-actuating relay to take care of varying changes in load conditions and to render the relay ineffective both during a steady-state load condition and also during normal changes in load conditions. If, however, a fault condition occurs, the device is utilized to render the relay effective to isolate the fault. Such discrimination between the load conditions and the fault conditions is accomplished by means of the voltage or energy-translating device, which consists essentially of a transformer having opposed identical windings, one winding of which is connected in a tuned circuit to which a voltage is applied, called an applied voltage, which is influenced by the load conditions and the fault conditions. The other winding is connected in a special way to the relay and is a means of furnishing energy or voltage to control the relay. Such voltage may be called the output voltage of the voltage-translating device. In broad terms, the translating device may be considered as means responsive to an input voltage or electrical quantity for automatically rendering another device effective when a fault occurs and for automatically pre-setting the other device in accordance with load conditions.

In pre-setting devices heretofore used, however, the amount of pre-setting in accordance with the load conditions, has been limited to the range of motion of the mechanical parts. In this invention, there are no moving parts, i. e., the device is mechanically static and depends on electrical quantities only for its operation. And, inasmuch as the pre-setting device always returns to its initial position after steady-state condition of load is reached, regardless of the magnitude of change in the load condition immediately preceding such return to the steady-state load conditions, it has, theoreticaly, at least, an infinite range of pre-setting. More specifically, it may be said that the output voltage or output electrical quantity always returns to substantially zero value when steady-state load conditions obtain. A brief description of the fundamental principle of operation of the translating device will serve to bring out the features more clearly.

A normal load condition may be either a substantially steady-state load condition or a varying or changing load condition. In either case, it is desired that the electrical system remain connected or that the circuit-breaker-actuating relays associated with such normal load conditions remain ineffective, regardless of the magnitude of such normal load conditions. This result is accomplished in the following manner.

When a steady-state load condition obtains, a steady-state input voltage exists relative to the translating device, which input voltage may or may not be of the same frequency as the load frequency, depending upon the type of protective system with which the translating device is utilized. Such steady-state voltage is applied to the primary winding of a transformer and induces in the secondary winding thereof an equal and opposite counter-acting or subtracting voltage, which leaves a resultant output voltage of substantially zero value. The value of the output voltage is the difference between the applied voltage and the induced voltage and, being zero in this case, is not effective to render operative a circuit-breaker-actuating relay, which relay is adjusted to be responsive to a predetermined value of voltage or other electrical quantity greater than zero.

In some types of protective systems, the input voltage also may be of zero value under steady-state load conditions, but, in any case, the output voltage will be substantially zero and the relay associated therewith ineffective.

When a varying load condition or change in load condition exists, a varying value of input voltage or electrical quantity will appear relative to the tuned circuit and the transformed primary winding associated therewith. The tuned circuit, being tuned to retard the passage of such changes in input electrical quantity, causes a relatively slow change in magnetization of the transformer, thereby permitting the voltage induced in the secondary winding of the transformer to follow closely the change in applied voltage, and, consequently, resulting in a relatively small value of output voltage—a value which is below the predetermined value required to render the relay effective.

After the varying load condition has reached a steady-state load condition, the output voltage of the translating device will become zero. Thus, it has a theoretically unlimited range of pre-setting, regardless of load conditions.

However, when a fault condition occurs, it is desired that its associated circuit-breaker-actuating relays be rendered effective to isolate the fault. Accompanying such a fault, there will be steep wave fronts, transients and electrical quantities of frequency the same as that of the normal frequency to which the protected apparatus is tuned and also of frequencies different from that of the normal frequency associated with the tuned translating device. The transients of the non-tuned frequencies will readily pass through the tuned circuit and have substantially no effect in rendering the circuit-breaker-actuating relay effective because they will permit a relatively quick magnetization of the transformer, and the induced subtractive voltage will follow closely the input voltage thereby resulting in no substantial output voltage of a magnitude sufficient to actuate the associated relay. The relay is rendered effective, however, by reason of the normal frequency transients produced by the fault condition, even though the magnitude of the fault condition may be less than that of a normal load condition.

Such normal frequency or special relay-frequency currents can traverse the tuned-resonant-circuit in a delayed or retarded time only, by reason of the fact that the tuned-resonant circuit is tuned to retard the passage of such currents of a substantially definite and predetermined frequency. Therefore, the appearance of the counteracting or opposing voltage is delayed in point of time by a corresponding amount, and, in the meantime, a substantial value of input voltage has already caused the relay to become effective before the counteracting voltage has had time to oppose the effects of such input voltage. The actuation of the relay then depends upon the magnitude, the rate of change and the frequency of the voltage applied to the tuned pre-setting and fault-discriminating device.

Figure 2:
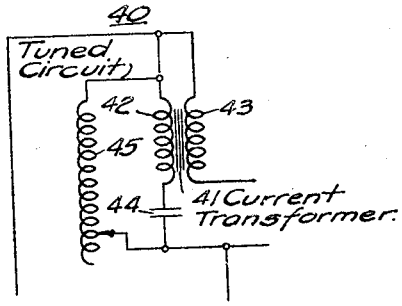

The means utilized to accomplish these results will now be described with reference to the accompanying drawings, wherein Figure 1 is a diagram illustrating my protective system as applied to a 500-cycle breaker-control system, Fig. 2 is a diagram illustrating the novel protective device separated from the power system, Fig. 3 is a diagram of a modification of the protective device, and Fig. 4 is a diagram of my protective system and device applied to an ordinary power system, having no superposed currents of special frequency.

*Description of construction*

By way of example, this invention will first be described with reference to Fig. 1.

The reference numerals 11 and 12 represent stations of a power system which are connected by lines or conductors, such as the parallel conductors 13 and 14 representing a portion or a section of an entire power system.

The power system is shown as a single-phase system, but it may be any alternating-current system whatever, or a direct-current system, overhead or underground. However, for purposes of example, it will be described, in detail, as a single-phase railway system, though the novel features which will be described later may be applied to any system whatever.

The illustrated devices 15 are the usual circuit-interrupters, or circuit-breakers, or isolating devices, or means, which, when actuated, serve to cut out or isolate faulty line conditions.

Main sources of power 16 may be connected to the lines or conductors 13 and 14 through sub-stations 11 and 12, either or both. Specifically, the devices shown are main power transformers, but, generically, they represent merely sources of main power at a frequency of 25 or 60 cycles, as an example.

The devices 21 represent generators or other auxiliary sources of power at a special frequency as, for instance, a 500-cycle frequency, which are superposed upon the main power system for the purpose of controlling the connections of a faulty conductor to the rest of the power system. The generators 21, as illustrated, are driven by motors 22, which may be, in turn, energized from the main source of power or may be direct-current motors or prime movers of any other type having suitable characteristics.

The devices 25 are tuned impedance devices of relatively very high impedance at the superposed frequency of 500 cycles and of relatively very low impedance at the normal main-source frequency of 25 or 60 cycles, as the case may be. In broad terms, the devices 25 are means for blocking or obstructing the passage of the superposed currents, and for freely filtering currents of main-source frequency. The devices 25 are severally composed of a condenser 26 and a reactor 27 connected in parallel-circuit relation, and are tuned to obstruct currents of the superposed frequency of 500 cycles supplied from the auxiliary sources of power 21.

The device 31 is a low-impedance device, a device having a relatively small value of impedance to the 500-cycle currents and also to the 60-cycle currents, which correspond, in this case, to the superposed frequency and the main-source frequency, respectively. Each device 31 is composed of a condenser 34 and a reactor 32 connected in parallel-circuit relation and tuned to the 500-cycle frequency. The principal purpose of these devices 31 is to provide means by which the 500-cycle current in a line on which a fault occurs, is rendered of greater magnitude than that which can flow in any adjacent or parallel non-faulty line, by reason of the series impedance differentials imposed by the devices 31.

Connected in the circuit with the condenser 34 is a current transformer 33 of the usual type, the purpose of which is to provide control currents or voltage for the actuation of the circuit-interrupters 15 when a fault occurs upon any of the conductors, such as the illustrated fault 61 relative to the conductor 13.

The matter thus far described has been considered in my copending application, Serial No. 227,462. The new subject-matter will now be treated in detail.

The device 41, constituting a portion of pre-setting device 40, shown by itself in Fig. 2, is a transformer comprising two windings 42 and 43 having the same number of turns on each winding and of usual construction, except that an air gap may be required in the iron core to prevent the core from saturating.

The device 44 is a condenser, the capacity reactance of which is of relatively large magnitude, in comparison with the reactance of the winding 42 on the transformer 41.

The device 45 is a reactor or reactance means and has such value of reactance that the parallel circuit, consisting of the transformer winding 42, the condenser 44 and this reactance 45, is resonant, or tuned to the frequency, in this case 500 cycles, applied from the current transformer 33 to the translating or pre-setting device 40, as a unit. The purpose is principally to provide a resonant circuit between the primary winding 42 of the transformer 41, the condenser 44 and the reactance 45. The purpose of providing a resonant circuit is to cause the current in the transformer winding 42 to rise slowly after a voltage is impressed on this resonant circuit. Other means than such resonant circuit 42, 44 and 45 which would give a slow rise of current in the winding 42 would be equally applicable.

A very large inductance means 46, connected in series relation with the transformer winding 42, as illustrated in Fig. 3, may be considered as another means of obtaining a slow rise of current in the transformer winding 42.

In Fig. 3 also, another means is illustrated for obtaining the input voltage from the line to be protected. Such voltage may be obtained from the condenser 34, as illustrated in Fig. 3, or from a current transformer 33, as illustrated in Fig. 1. In either case, such voltage will be proportional to the current produced by conditions in the line 13 to be protected. The preferred method is, however, to utilize a current transformer as, for example, the transformer 33.

The transformer 41 is so connected in circuit that the voltage induced in the winding 43 is opposed and normally equal to the voltage impressed across the winding 42.

The device 51 is a vacuum-tube mercury relay which becomes effective at a critical voltage to cause a glow discharge between its electrodes 52 and 53. The glow discharge will cause a mercury arc to be established between electrodes 52 and 54, for the purpose of completing the circuit between a battery 55 and the trip coil 56 of the circuit-breaker 15. In broad terms, the device 51 is means responsive to a definite or predetermined, or critical voltage for controlling a circuit-interrupter, and it may be, therefore, any type of circuit-breaker-actuating relay having such characteristics.

By way of example, the operation of this invention will be described with reference to Fig. 1, as follows:

The fundamental details of the description of the operation of this 500-cycle protective system have been described with particularity in the copending application hereinbefore mentioned, but they will be outlined here again.

Under normal conditions of operation, the circuit-interrupters 15 are closed, and the main conductors or lines 13 and 14 are energized with main-source power at 25 or 60 cycles, for example, which power is supplied by the main sources 16.

The generating devices 21 operate synchronously with each other and generate a 500-cycle voltage which is applied to the power system as illustrated, but, under normal conditions, substantially no 500-cycle current flows, or if any such current does flow, it is in an amount insufficient to cause actuation of the circuit-interrupters 15.

When a fault, such as the fault 61, occurs, relative to the conductor 13 a 500-cycle current traverses the current transformer 33, which current is translated into the presetting device 40 and from there to the circuit-breaker-actuating relay 51, which responds and causes actuation of the circuit-interrupters 15, thereby isolating the faulty conductor 13 from the rest of the power system.

A description of operation of the pre-setting device 40 will now be given in greater detail.

The device 40 is, under normal conditions, practically a high-impedance circuit placed across the secondary winding 35 of the current transformer 33. A fault, such as the fault 61, on the conductor 13, will, of course, produce a considerable voltage at the secondary winding 35 of the current transformer 33. This voltage will reach its full value and will appear across the input-terminals 52, 53 of the relay tube 51 immediately after the fault 61 occurs on the conductor 13, because the winding 42 of the transformer 41 will not immediately pass the full magnetizing current and produce a counter-voltage in winding 43. Thus, the initial voltage across the electrodes 52 and 53 of the relay 51 will be equal to the voltage across the secondary winding 35 of the current transformer 33 and this voltage will be sufficient, in magnitude, to cause operation of the relay 51. The adjustment of the relay 51 to a predetermined voltage may be made by changing the variable tap on the current transformer 33 in order to change the voltage across the secondary winding 35.

In case a voltage appears across the secondary winding 35 which increases slowly in value, as, for example, a voltage produced because of the two auxiliary generators 21 becoming slightly out of normal synchronous phase position thereby producing a slowly rising voltage, or on account of a load being drawn from the conductor 13, then the current in the winding 42 of the transformer 41 will rise rapidly enough to induce, in the secondary winding 43 of the transformer 41, a voltage opposing the voltage derived from the current transformer winding 35, which opposing voltage will prevent the relay 51 from operating or becoming effective, that is, the voltage which is induced in the winding 43 must always subtract from the input voltage applied to the transient device 40, leaving the difference in voltage for the actuation of the relay 51.

In case a load is placed upon the conductor or line 13, there will again be an input voltage applied to the transient device 40. However, such voltage will be insufficient to cause actuation of the relay 51. During the time interval that such voltage is applied, current will build up in the winding 42 of the transformer 41 which will induce an equal opposing voltage in the winding 43. After such transient condition is past, the output voltage across the tube relay 51 will be substantially zero, even though an input voltage remains across the device 40, because this input voltage will be entirely counteracted by the voltage induced in the winding 43. Therefore, the output voltage which appears at the relay 51 is at the first instant, the change in the voltage applied to the device 40, regardless of what previous steady-state voltage has been applied to the device 40. More broadly, the device 40 permits the relay 51 to operate only during the persistance of the transient of applied or input voltage. The advantage of this method of operation is that the device 40 pre-sets the relay 51 for any condition of load on the main power system and allows the relay 51 to become effective only if a voltage, such as a voltage produced by a fault, is applied to the device 40, which, in itself, should be the condition to cause the relay 51 to operate.

To facilitate understanding the operation of the transformer 41 it may be compared to an "induction regulator" having a one-to-one transformer ratio. It is known that an induction regulator may be rotated into such position that the voltage across its output side may be either twice the input voltage or zero. The latter position and the connections correspond quite exactly to those of the transformer 41.

It is known that the transient or rise of current in a parallel resonant circuit may be made very slow and that it is a function of the amount of inductance and capacity present in the circuit. Under steady-state conditions, an appreciable current, which will, in this case, be the magnetizing current of the transformer 41, will flow in the parallel circuit comprising the winding 42, the condenser 44 and the reactor 45. It is evident that the position of this current in phase relation must be substantially either 90° ahead or 90° behind the applied voltage if the induced voltage in the secondary winding 43 is to counteract the voltage impressed across the device 40. To obtain this 90° phase relation of the current and voltage, the reactance of the condenser 44 is made large, as compared with the reactance of the winding 42.

The fundamental principles upon which this transient device 40 operates, may be summarized as follows: given an applied voltage on its input side, there is initially, for an instant, the same magnitude of voltage on its output side, which output voltage gradually decreases to substantially zero value, with lapse of time, because a delayed or slowly rising transformer magnetizing current will induce a slowly rising voltage subtractive from the input voltage applied and, therefore, the output voltage, which is the difference between the input voltage and the subtractive induced voltage must, after steady-state conditions are reached, always returns to substantially zero value.

The slowly rising or delayed transformer magnetizing current is secured by utilizing a resonant circuit tuned to the normal frequency of the magnetizing current, one of the transformer windings forming a portion of such tuned circuit.

By reason of the fact that the resonant circuit 42, 44, 45 is tuned to the applied relay frequency only or to the frequency of the 500-cycle generators or auxiliary sources of power, changes in magnitude of such normal-frequency relaying current can produce a transformer magnetizing current of slowly rising or time-delayed action only. Consequently, the induced subtractive secondary voltage will have opportunity to build itself up, following closely the applied input increments of current and voltage; and, therefore, the resultant output voltage, which is the difference between the input voltage and the induced subtractive voltage, will be kept at a relatively small value; the value which, by adjustment of a relay tube 51 and other adjustments, may be kept beneath the value required to render such relay effective for the actuation of a circuit-breaker, as in this use of the invention.

This invention, therefore, may be utilized to render a relay ineffective for normal changes in value of current or voltage at a definite frequency or in this use of the invention, for changes in value of load conditions. It should also be carefully observed that the output voltage always returns to its initial value of substantially zero after such change in value of load condition has reached a steady load condition and that, therefore, the device may be used to preset for any magnitude of load conditions by reason of the fact that there are no limits of motion such as exist in devices heretofore used for pre-setting. For example, a mechanical presetting device is limited in its action by the range of motion of its mechanical parts.

When normal changes in magnitudes of energy occur at the applied relaying frequency, the relay 51 associated therewith is maintained ineffective, regardless of the range of such changes and of the total value of energy resultant from such changes. However, when a fault condition arises, energy values are produced and applied to the device 40, which may be called transients. When applied to the device 40, such transients build up a magnetizing current relatively slowly in the transformer 41, because the resonant circuit comprising the devices 42, 44 and 45, being tuned to normal relaying frequency, allows the magnetizing current resulting from the transients to pass only with substantial time delay. Consequently, a resultant output voltage of substantial magnitude and of the normal applied relaying frequency will appear quickly and may be utilized to isolate the fault producing it. When utilized as a part of a protective system, the device will, therefore, discriminate between a load condition and a fault condition.

Further, it should be carefully noted that this protective device and system is not limited to any particular type of electric system. It may be applied to the protection of electrical apparatus generally, such as motors, generators, transformers, etc. whether alternating current or direct current, and to power systems generally.

The system is, of course, not limited to the superposed frequency control system of Fig. 1. It may be applied to, and rendered responsive to, a normal frequency which is a commercial frequency of say 25 cycles or 60 cycles, as is illustrated in Fig. 4, in which case the resonant circuit 42, 44 and 45 is tuned to the applied frequency of 60 cycles or to 25 cycles, as the case may be, in order to retard, in point of time, the passage of such energy at the applied frequency to the transformer 41.

The applied voltage may be obtained, as before described with reference to Fig. 1, from a current transformer, such as the current transformer 71, having a primary winding 73 energized from the line 13 to be protected and a secondary winding 72 for furnishing the so-called applied voltage for controlling the pre-setting and fault-discriminating device 40.

When applied to a three-phase power system, one transient responsive device 40 may be utilized per phase at each end of the line to be protected, or one such device may be applied to all the phases at or near each end of the line.

The principal advantages of this protective system and apparatus are as follows:

The system provides means by which a relay may be operated only with rapid rise or rapid change of current values at a predetermined frequency, such as those which occur when a short-circuit or fault is applied to a portion of a power network and which relay is unactuated by normal load conditions or load conditions generally.

The system provides means of pre-setting a circuit-breaker-operating relay in such manner as to avoid relay operation regardless of load condition, though a heavy load current may exceed in value the minimum short-circuit current or fault condition. Thus, the system, in itself, discriminates between a fault condition and a load condition on any power system whatever, whether it be a superposed 500-cycle system or otherwise.

The system provides means for pre-setting or otherwise controlling a relay, which control is independent of mechanical motion, with its consequent objections. It provides means without moving parts and entirely mechanically static in its operation.

Another advantage is that it provides means for pre-setting or otherwise controlling a relay which is relatively without limit in the value of current for which it can preset, whereas any mechanical pre-setting device is limited by the maximum motion of the armature of its presetting coil, for example.

The system provides a presetting means which normally re-adjusts itself to its zero position or initial position, and, consequently, is not limited in range of presetting adjustment for automatic operation. In other words, it automatically returns to its initial position.

Such changes and substitutions as may be made by those skilled in the art are to be construed as within the scope of the appended claims, except as limitations may be imposed by the prior art.

I claim as my invention:

1. In a protective system, the combination with an electrical system having a source of energy of a substantially definite frequency associated therewith, of a device comprising a resonant circuit tuned to retard the passage of energy applied at the definite frequency and a transformer responsive to such energy for opposing the effects of the voltage associated with such energy.

2. In a protective system, the combination with an electrical system having a source of energy of a substantially definite frequency associated therewith, of a device responsive to a predetermined voltage, a transformer for controlling said device, and means responsive to the definite-frequency energy for causing relatively slow change in the energization of said transformer.

3. In a protective system, the combination with a line of a power system having a source of voltage connected thereto, transforming means for energizing means comprising a tuned circuit and a transformer responsive only to relatively rapid changes in value of voltage for controlling the connections of the line.

4. In a protective system, the combination with an electrical system, and a relay associated therewith, of a voltage-translating device comprising a tuned circuit and a transformer, one winding of the transformer forming a portion of the tuned circuit and another winding being utilized to control the relay, the windings being opposed and counteracting.

5. In a protective system, the combination with an electrical system, and a relay associated therewith, of means for controlling the relay comprising a tuned circuit and a transformer and characterized by the fact that the tuned circuit causes relatively slow changes of magnetization of the transformer.

6. In a protective system, the combination with a power system, and a relay associated therewith, of a device comprising a tuned circuit and a transformer for automatically pre-setting the relay to a constant definite value regardless of the magnitude of the changes in load conditions and characterized by the fact that the range of pre-setting is theoretically infinite.

7. Protective system for an electric system comprising a circuit interrupter, means responsive to an applied voltage of a predetermined frequency derived from the electric system for providing a time-retarded voltage and a relay responsive to a predetermined value of the difference between the applied voltage and the retarded voltage for controlling the circuit interrupter.

8. Protective system for a line to be protected in an electric system comprising a circuit interrupter actuated by a relay responsive to a predetermined voltage value and a tuned pre-setting and fault-discriminating device responsive to the magnitude of, the rate of change of, and a predetermined frequency of the voltage for controlling the circuit-interrupter-actuating relay.

9. In a protective system, the combination with a line transformer energized from a line to be protected, of a relay pre-setting transformer having a common terminal connected to the line transformer, a condenser connected to another terminal of said relay-pre-setting transformer and to the line transformer, a reactor connected in circuit relation with the condenser and with the relay pre-setting transformer, and a relay connected to the relay pre-setting transformer and to the condenser.

10. In a protective system, the combination with a current transformer connected to a line to be protected, of a relay-pre-setting transformer having a common terminal connected to the current transformer, a condenser connected to another terminal of said relay-pre-setting transformer and to the current transformer, a reactor connected in parallel-circuit relation with the condenser and with the relay pre-setting transformer, and a relay having one terminal connected to the relay-pre-setting transformer and having another terminal connected to the condenser and to the reactor.

11. The combination with a commercial electrical power-transmitting system comprising a plurality of lines joined at one or more common points, of sectionalizing interrupter means in the lines, and a relaying means for controlling said sectionalizing means, said relaying means comprising an auxiliary source of relaying energy of a frequency higher than commercial alternating-current frequencies of power lines, means for superposing said relaying frequency on said power-transmitting system, means for deriving a voltage selectively responsive to the relay-frequency currents in a line-section to be protected, a parallel-resonant relay-frequency circuit having a reactive branch and a capacitive branch, a transformer having a primary winding and a secondary winding, an over-voltage relay operatively associated with an interrupter means of said line to be protected, and connections for applying said derived voltage to both said parallel-resonant circuit and said relay, with the primary winding of said transformer in series with the capacitive branch of the parallel-resonant circuit and the secondary winding of the transformer in series with the relay and in opposition to said derived voltage, the relay-frequency reactance of the capacitive branch of the parallel-resonant circuit being large as compared with the relay-frequency reactance of said primary winding.

12. The combination with a multiple-circuit line having sectionalizing interrupter means in the several circuits, of a relaying means for controlling said sectionalizing means, said relaying means comprising an auxiliary source of relaying energy of a frequency higher than said line, means for superposing said relaying frequency on said line, means for deriving a voltage selectively responsive to the relay-frequency currents in a line-section to be protected, a parallel-resonant relay-frequency circuit having a reactive branch and a capacitive branch, a transformer having a primary winding and a secondary winding, an over-voltage relay operatively associated with an interrupter means of said line to be protected, and connections for applying said derived voltage to both said parallel-resonant circuit and said relay, with the primary winding of said transformer in series with a branch of the parallel-resonant circuit and the secondary winding of the transformer in series with the relay and in opposition to said derived voltage, the relay-frequency reactance of the respective branches of the parallel-resonant circuit being large as compared with the relay-frequency reactance of said primary winding.

13. The combination with a multiple-circuit alternating-current line having sectionalizing interrupter means in the several circuits, of a relaying means for controlling said sectionalizing means, said relaying means comprising an auxiliary source of relaying energy of a frequency higher than the frequency of said alternating-current line, means for superposing said relaying frequency on said line, means for deriving a voltage selectively responsive to the relay-frequency currents in a line-section to be protected, a parallel-resonant relay-frequency circuit having a reactive branch and a capacitive branch, a transformer having a primary winding and a secondary winding, an over-voltage relay operatively associated with an interrupter means of said line to be protected, and connections for applying said derived voltage to both said parallel-resonant circuit and said relay, with the primary winding of said transformer in series with a branch of the parallel resonant circuit and the secondary winding of the transformer in series with the relay and in opposition to said derived voltage, the relay-frequency reactance of the respective branches of the parallel-resonant circuit being large as compared with the relay-frequency reactance of said primary winding, said relay comprising a vacuum tube having a critical-voltage input circuit which constitutes practically an open circuit as compared to the parallel-connected parallel-resonant circuit.

14. The combination with a multiple-circuit power line having sectionalizing interrupter means in the several circuits, of a relaying means for controlling said sectionalizing means, said relaying means comprising an auxiliary source of relaying energy of a frequency higher than said line, means for superposing said relaying frequency on said line, means for deriving a substantially instantaneously responsive force selectively responsive to the relay-frequency currents in a line-section to be protected, means for deriving a slowly responsive force selectively responsive to the relay-frequency currents in the line-section to be protected, means for balancing said forces the one against the other, and quick-acting means for responding to a predetermined unbalance of said forces for effecting the actuation of an interrupter means of said line-section to be protected before said forces again become substantially balanced upon the occurrence of a fault in the line-section to be protected.

15. The combination with a multiple-circuit power line having sectionalizing interrupter means in the several circuits, of means for deriving a substantially instantaneously responsive force selectively responsive to currents in a line-section to be protected, means for deriving a slowly responsive force selectively responsive to currents in the line-section to be protected, means for balancing said forces the one against the other, and quick-acting means for responding to a predetermined unbalance of said forces for effecting the actuation of an interrupter means of said line-section to be protected before said forces again become substantially balanced upon the occurrence of a fault in the line-section to be protected.

In testimony whereof, I have hereunto subscribed my name this 26th day of April, 1928.

LEON R. LUDWIG.